United States Patent [19]

Imai et al.

[11] Patent Number: 4,841,507
[45] Date of Patent: Jun. 20, 1989

[54] OPTICAL HEAD FOR AN OPTICAL RECORDING AND REPRODUCING APPARATUS

[75] Inventors: Hitoshi Imai; Ryuichiro Arai; Kimiyuki Koyanagi; Michihiro Tadokoro, all of Amagasaki, Japan

[73] Assignee: Mitsubishi Denki Kabushiki Kaisha, Japan

[21] Appl. No.: 127,049

[22] Filed: Dec. 1, 1987

[30] Foreign Application Priority Data

Dec. 5, 1986 [JP] Japan .................................. 61-186833

[51] Int. Cl.$^4$ .............................................. G11B 7/00
[52] U.S. Cl. ........................................ 369/44; 369/45; 369/46; 369/112; 250/201
[58] Field of Search ...................... 369/43–47, 369/112, 110; 358/342; 250/201 DF

[56] References Cited

U.S. PATENT DOCUMENTS 4,273,998 6/1981 Kanamaru .................... 369/45 X
4,406,520 9/1983 Sato et al. ...................... 369/110 X
4,656,618 4/1987 Kaku et al. .......................... 369/112

FOREIGN PATENT DOCUMENTS 60-76038 4/1985 Japan .
61-29049 7/1985 Japan .

*Primary Examiner*—Robert L. Richardson
*Attorney, Agent, or Firm*—Leydig, Voit & Mayer

[57] ABSTRACT

An optical head for optical recording and reproducing system comprising a light source, a first optical means for introducing a light beam from the light source into a guide groove formed in a recording surface of an information carrier, and a second optical means for separating a reflected light beam reflected from the guide groove from the light beam from the light source. The optical head also comprises an optical element having formed thereon at its center a cylindrical surface and on both sides slanted surfaces for dividing the reflected light beam into three, and a light receiving element having at least three light receiving units for receiving the respective light beams divided into three by the optical element.

17 Claims, 5 Drawing Sheets

FIG. 3a
PRIOR ART
FIG. 3b
PRIOR ART
FIG. 3c
PRIOR ART
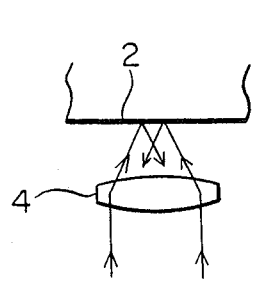
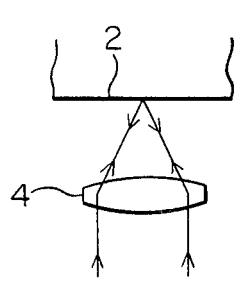
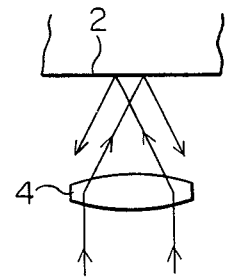
FIG. 4a
PRIOR ART
FIG. 4b
PRIOR ART
FIG. 4c
PRIOR ART
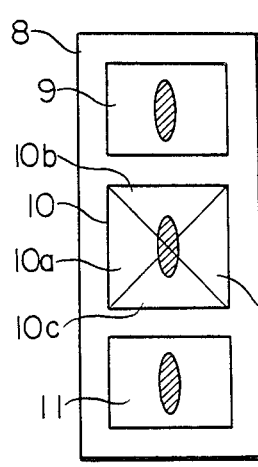
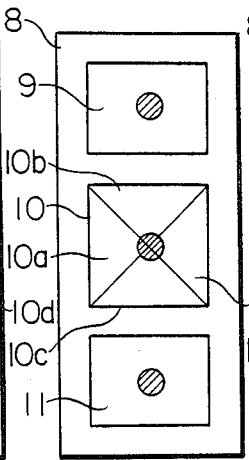
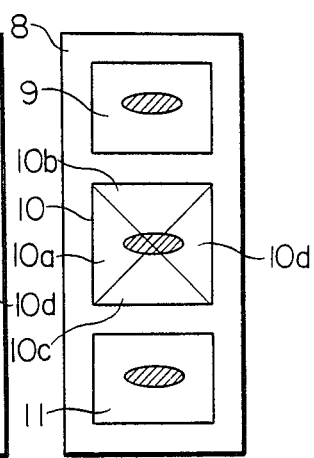

OPTICAL HEAD FOR AN OPTICAL RECORDING AND REPRODUCING APPARATUS

BACKGROUND OF THE INVENTION

This invention relates to an optical head for an optical recording and reproducing apparatus by which information is optically recorded and reproduced on an information carrier surface.

FIG. 1 illustrates a conventional optical head disclosed for example in Japanese Patent Laid-Open No. 6076038, in which a light beam emitted from a semiconductor laser 1 is collected by an objective lens 4 and focused in one of guide grooves 3 in an information carrier 2. The reference numeral 5 designates a half prism which allows the passage of the light beam from the semiconductor laser 1 therethrough and which reflects a light beam reflected from the information carrier 2. The reflected light beam from the information carrier 2 is divided into three beams is passed through a cylindrical lens 7 exhibiting a lens function in one direction and the divided beams are introduced into a light receiving element 8 which converts light signals into electrical signals. The light receiving element 8 comprises three light receiving units 9, 10 and 11.

With the above construction, the light beam emitted from the semiconductor laser 1 is collected on the information carrier 2 through the half prism 5 and the objective lens 4 and, after being reflected, returns along the same path as the incoming light path. However, the light beam is reflected at the half prism 5 in a direction perpendicular to the light beam directed the semiconductor laser 1 to pass through the prism 6 positioned on the far field region of the reflected light beam. FIG. 2 illustrates the relationship of the prism 6 and the light beam passing through the prism 6, from which it is seen that the light beam 13 is divided into three when passing through the slanted surface 6a and 6c and the top surface 6b of the prism 6, and the divided beams reach the light receiving element 8 after passing through the cylindrical lens 7. The prism 6 has a trapezoidal cross section and has formed thereon side slanted surfaces 6a and 6c and a central flat surface 6b.

Description will now be made as to the principle according to which a focus error signal can be obtained. FIGS. 3a, 3b and 3c as well as FIGS. 4a, 4b and 4c are views illustrating relationships between various relative positional relationships of the information carrier 2 to the objective lens 4 and the corresponding shape of the spot on the receiving element 8. In FIGS. 4a, 4b and 4c, the reference numerals 9, 10 and 11 designate the light receiving units on the light receiving element 8, the light receiving unit 10 comprising four light receiving units 10a, 10b, 10c and 10d. As shown in FIGS. 4a, 4b and 4c, the light beam passed through a cylindrical lens 7 provides a light spot (shown by a shaded circle) on the light receiving element 8 which varies in shape as shown in FIGS. 4a, 4b and 4c corresponding with the relative positional relationship between the information carrier 2 and the objective lens 4 as shown in FIGS. 3a, 3b and 3c. Thus, by picking up these changes of the spot shape in the form of the following equation as an electrical signal, a focus error signal can be obtained.

$$[\text{light receiving unit } 10a \text{ output} + \text{light receiving unit } 10d \text{ output}] - [\text{light receiving unit } 10b \text{ output} + \text{light receiving unit } 10c \text{ output}] \ldots \quad (1)$$

Next, description will be made as to the principle according to which a tracking error signal can be obtained. FIGS. 5a, 5b and 5c illustrate relative positional relationship between the focused light spot and the guide groove 3 on the information carrier 2, and FIGS. 6a, 6b and 6c illustrate the relationship with respect to the light beams passing through the corresponding prisms. In these figures, the reference numeral 12 designates a light beam focused by the objective lens 4, and 13 designates a light beam passing through the prism 6. As shown in FIGS. 5a and 6a or 5c and 6c, when the light beam 12 shifts from the center of the guide groove 3, the light beam passing through the slanted surface 6a or 6c varies in light amount due to the influence of the diffracted light of the ± first order. Since the light beam which passed through the slanted surfaces 6a and 6c reaches the light receiving units 9 and 11 in FIG. 4, the amount of the light which reaches the light receiving units 9 and 11 varies in accordance with the relative positional relationship between the focused spot and the guide groove 3. By picking up these changes as an electrical signal in the form of the following equation, a tracking error signal can be obtained.

$$[\text{light receiving unit } 9 \text{ output}] - [\text{light receiving unit } 11 \text{ output}] \ldots \quad (2)$$

As the conventional optical heads are constructed in such a manner as above, there was a problem in that cylindrical lenses 7 had to be disposed therein to obtain the focus error signal, increasing the number of optical parts.

SUMMARY OF THE INVENTION

The present invention was developed to resolve the above mentioned problem, so that the number of optical parts can be reduced, as a result of which the present invention is aimed at providing an optical head that can be miniaturized.

The optical head according to the present invention has formed a cylindrical surface in the central portion of its prism.

According to the present invention, the central portion of the prism is formed as a cylindrical lens and even when the cylindrical lens is omitted, the light beam which passes therethrough varies in the shape of the light spot on the light receiving unit in accordance with the relative positional relationship between the information carrier and the objective lens, so that the optical head functions in a manner similar to that provided with a cylindrical lens.

BRIEF DESCRIPTION OF THE DRAWINGS

The present invention will become more readily apparent from the following detailed description of the preferred embodiment of the present invention taken in conjunction with the accompanying drawings, in which:

FIGS. 3a–3d and 4a–4c are diagrams useful for explaining the principle of a means for obtaining the focus error signal in FIG. 1;

DESCRIPTION OF THE PREFERRED EMBODIMENT

Figure 7:
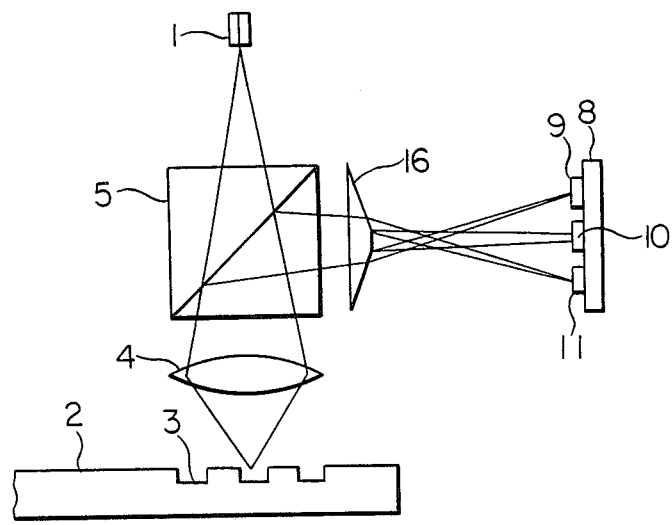
FIG. 7 is a a diagram showing an optical path of one embodiment of the present invention.
Figure 8:
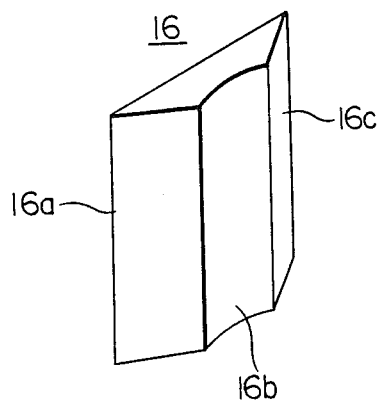
FIG. 8 is a perpsective view of a portion of the head shown in FIG. 7.

FIGS. 7 and 8 illustrate one embodiment of the present invention, in which a prism 16 having a substantially trapezoidal cross section has on its central portion between slanted surfaces 16a and 16c a cylindrical surface 16b, and each of the slanted surfaces is disposed so that the direction of dividing line of each of the surfaces optically coincides with the direction of extension of the guide groove 3.

Figure 1:
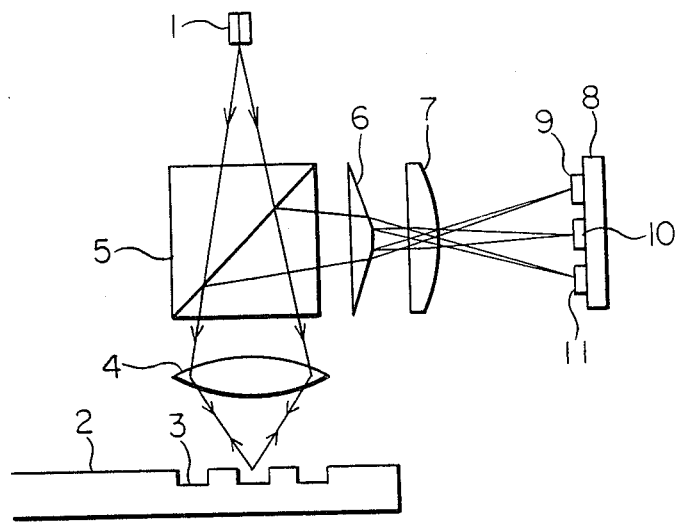
FIG. 1 is a diagram showing an optical path of the conventional optical head.
Figure 2:
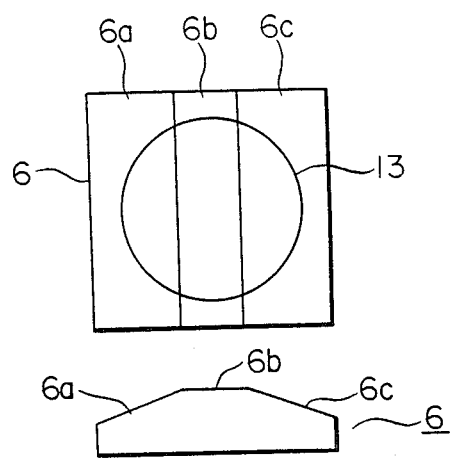
FIG. 2 is a view showing the relationship between the light beam and the prism shown in FIG. 1.
Figures 9A, 9B, 9C:
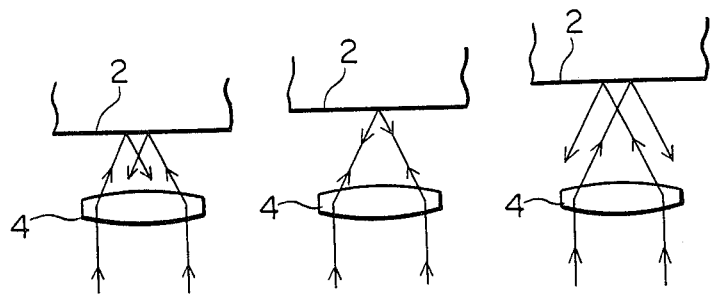
FIGS. 9a–9c and 10a–10c are diagrams useful for explaining the principle of a means for obtaining the focus error signal in FIG. 7.
Figures 10A, 10B, 10C:
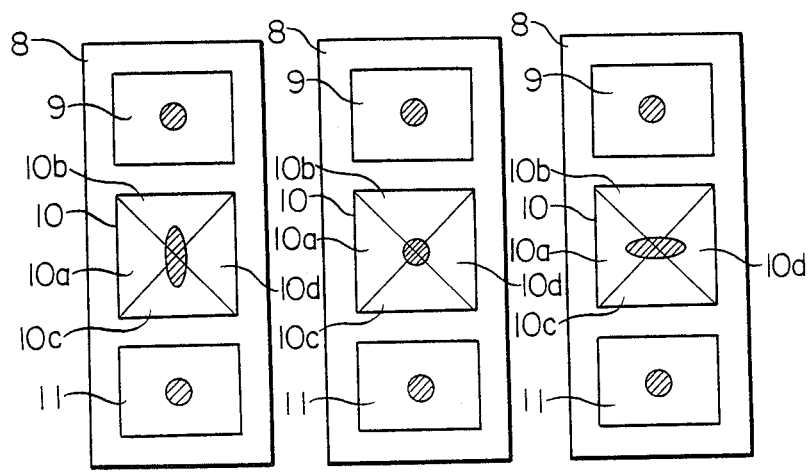

The reference numerals which are the same as those used in FIG. 1 indicate identical components. It is to be noted that the cylindrical lens 7 in FIG. 1 is removed The operation will now be described. A diverging light beam emitted from the semiconductor laser 1 passes through the half-prism 5 and the objective lens 4 and focused on the information carrier 2. The light beam is then reflected in the opposite direction along the same light path as before and is reflected by the half-prism 5 toward the prism 16. The reflected light beam passed through the prism 16 is divided into three by the slanted surfaces 16a and 16c and the cylindrical surface 16b. Since the central portion of the prism 16 is a cylindrical lens, the light beam which passes through the central portion varies the spot configuration shown by a shaded circle on the light receiving unit 10 as shown in FIGS. 10a, 10b and 10c in correspondence with the relative positional relationship between the information carrier and the objective lens shown in FIGS. 9a, 9b and 9c. By picking up these changes as an electrical signal in a form similar to the equation (1), the focus error signal can be obtained.

Figure 5A:
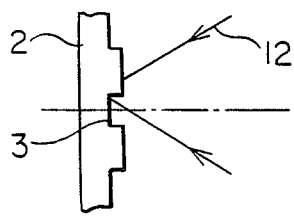
FIGS. 5a–5c and 6a–6c are diagrams useful for explaining the principle of means for obtaining a tracking error signal in FIG. 1.
Figure 6A:
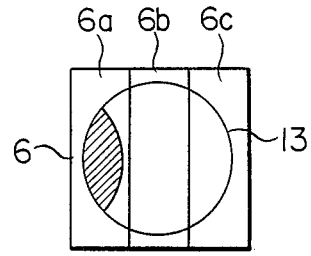
Figure 5B:
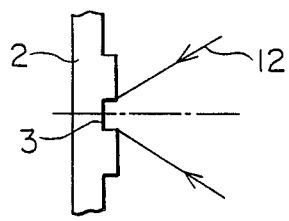
Figure 6B:
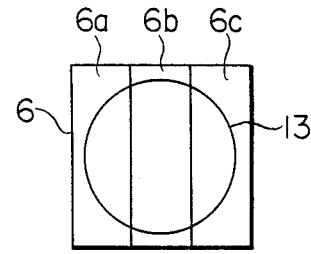
Figure 5C:
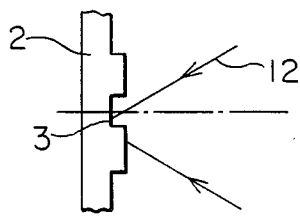
Figure 6C:
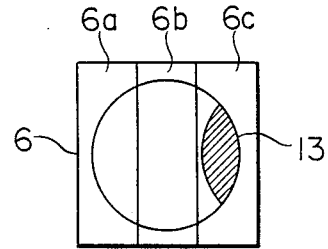

Now, how the tracking error signal is obtained will be explained with reference also to FIGS. 5 and 6. As shown in FIGS. 5a and 6a or 5c and 6c, when the light beam 12 is shifted from the center of the guide groove 3 the light quantity of the light beam passing through the slanted surface 16a or 16c of the prism 16 varies due to the influence of the diffracted light of the ± first order. The light beam which passed through the slanted surfaces 16a and 16c reaches the light receiving units 9 and 11 in FIG. 10, so that the quantity of light which reaches the light receiving units 9 and 11 varies in accordance with the relative positional relationship between the focused light spot and the guide groove 3. By picking up this change as an electrical signal in a form identical to the equation (2) the tracking error signal can be obtained.

As has been described, according to the present invention, since the central portion of the prism for dividing the light beam into three is formed into a cylindrical surface, the conventional cylindrical lens used for obtaining the focus error signal can be omitted, so that a less expensive and small-sized optical head can be obtained.

What is claimed is:

1. An optical head for an optical recording and reproducing system including an information carrier having a recording surface and a guide groove formed in the recording surface, said optical head comprising:

a light source adapted to generate a first light beam;

a first optical means for focusing said first light beam along a first light path and into the guide groove;

a second optical means for reflecting a reflected light beam, initially reflected from the guide groove along the first light path, away from the first light path and along a second light path;

an optical element disposed in the second light path and having a face including a cylindrical surface formed on a central portion of said face and slanted surfaces formed on said face on both sides of said central cylindrical surface, said optical element being adapted to divide the reflected light beam into three light beams; and a light receiving element having at least three light receiving units receiving the respective light beams divided by said optical element.

2. An optical head for an optical recording and reproducing system including an information carrier having a recording surface and a guide groove formed in the recording surface, said optical head comprising:

a laser adapted to generate a first light beam;

a first prism having a face including two slanted surfaces and a central cylindrical portion defining a cylindrical lens;

means including said first prism, for focusing said first light beam on the information carrier; and means, including said first prism, for tracking said first light beam in the guide groove.

3. An optical recording and reproducing system according to claim 2 wherein the information carrier reflects the first light beam focused thereon and provides a reflected light beam, and wherein said system further comprises a second prism disposed in the path of the reflected light beam and adapted to reflect the reflected light beam toward said first prism.

4. An optical recording and reproducing system according to claim 3 wherein said first prism divides the reflected light beam into a plurality of divided light beams and wherein said focusing means and said tracking means further include a light receiving element having a plurality of light receiving units.

5. An optical recording and reproducing system according to claim 4 wherein said focusing means includes means, including said cylindrical lens portion of said first prism, for refracting a divided light beam toward a predetermined unit of said plurality of light receiving units.

6. An optical recording and reproducing system according to claim 5 wherein said plurality of light receiving units are disposed in an arrangement on said light receiving element and wherein said predetermined light receiving unit comprises a unit disposed centrally within the arrangement of said plurality of light receiving units.

7. An optical recording and reproducing system according to claim 4 wherein said tracking means includes means, comprising said slanted surfaces of said first prism, for reflecting a divided light beam toward a predetermined unit of said plurality of light receiving units.

8. An optical recording and reproducing system according to claim 7 wherein said plurality of light receiving units are disposed in an arrangement on said light receiving element and wherein said predetermined light receiving unit comprises a unit disposed substantially about the periphery of the arrangement of said plurality of light receiving units.

9. An optical recording and reproducing system according to claim 3 wherein said focusing means further includes a lens disposed in the path of said first light beam between said second prism and said the information carrier, said lens being operatively associated with said the information carrier to focus said first light beam in the guide groove.

10. An optical head for an optical recording and reproducing system including an information carrier, said optical head comprising:
 a laser adapted to generate a first light beam which is directed toward the information carrier along a first light path which is reflected from the information carrier to provide a reflected light beam;
 a first prism disposed in the first light path and reflecting the reflected light beam, along a second light path;
 a light receiving element disposed in the second light path; and
 a second prism disposed in the second light path between said light receiving element and said first prism, said second prism having a substantially trapezoidal cross section and a central cylindrical surface.

11. An optical head according to claim 10 wherein said light receiving element comprises a plurality of light receiving units disposed in an arrangement on said light receiving element.

12. An optical head according to claim 11 wherein said second prism is adapted to divide the reflected light beam, reflected along the second light path, into a plurality of divided light beams.

13. An optical head according to claim 12 wherein said central cylindrical surface of said second prism comprises a cylindrical lens adapted to refract a predetermined one of the plurality of divided light beams toward a predetermined one of said plurality of light receiving units.

14. An optical head according to claim 13 wherein the predetermined light receiving unit is disposed substantially centrally within the arrangement of said plurality of light receiving units.

15. An optical head according to claim 12 wherein said second prism comprises slanted surfaces disposed on both sides of said central cylindrical surface.

16. An optical head according to claim 15 wherein each of said slanted surfaces is adapted to refract a predetermined one of the plurality of divided light beams toward a predetermined one of said plurality of light receiving units.

17. An optical head according to claim 16 wherein the predetermined light receiving unit is disposed substantially about the periphery of the arrangement of said plurality of light receiving units.

* * * * *